United States Patent
Kato

(10) Patent No.: US 10,605,369 B2
(45) Date of Patent: Mar. 31, 2020

(54) SEALING APPARATUS

(71) Applicant: NOK CORPORATION, Tokyo (JP)

(72) Inventor: Takuya Kato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 60 days.

(21) Appl. No.: 15/885,999

(22) Filed: Feb. 1, 2018

(65) Prior Publication Data

US 2018/0156336 A1    Jun. 7, 2018

Related U.S. Application Data

(63) Continuation of application No. PCT/JP2016/075165, filed on Aug. 29, 2016.

(30) Foreign Application Priority Data

Sep. 1, 2015   (JP) ................. 2015-172041

(51) Int. Cl.
   *F16J 15/447* (2006.01)
   *F16J 15/3232* (2016.01)
   (Continued)

(52) U.S. Cl.
   CPC ........... *F16J 15/447* (2013.01); *F16C 33/782* (2013.01); *F16C 33/7883* (2013.01);
   (Continued)

(58) Field of Classification Search
   CPC .... F16J 15/447; F16J 15/3232; F16C 33/782; F16C 33/7883; F16C 33/805; F16C 41/007; F16C 19/186; F16C 2326/02
   See application file for complete search history.

(56) References Cited

U.S. PATENT DOCUMENTS

| | | | |
|---|---|---|---|
| 8,342,535 B2* | 1/2013 | Lattime | F16C 33/7813 277/412 |
| 8,991,829 B2* | 3/2015 | Lattime | F16J 15/3256 277/409 |

(Continued)

FOREIGN PATENT DOCUMENTS

| | | |
|---|---|---|
| CN | 2402874 Y | 10/2000 |
| CN | 101910692 A | 12/2010 |

(Continued)

OTHER PUBLICATIONS

Extended European Search Report for corresponding European Application No. 16841783.0 dated Feb. 27, 2019.

(Continued)

*Primary Examiner* — Gilbert Y Lee
(74) *Attorney, Agent, or Firm* — Pearne & Gordon LLP

(57) ABSTRACT

A sealing apparatus includes a sealing apparatus body attached to an outer ring of a hub bearing, and a slinger attached to a hub, and the sealing apparatus body includes a reinforcement ring and an elastic body portion. The elastic body portion includes seal lips contacting the slinger, and a labyrinth lip forming a gap from the slinger. The slinger includes a slinger cylinder portion, a slinger flange portion, a slinger bent portion, and a slinger extended portion, and the slinger bent portion and the slinger extended portion form a labyrinth seal L1, having gaps between the elastic body portion and the outer ring.

5 Claims, 3 Drawing Sheets

(51) Int. Cl.
  *F16C 33/78* (2006.01)
  *F16C 33/80* (2006.01)
  *F16C 41/00* (2006.01)
  *F16C 19/18* (2006.01)

(52) U.S. Cl.
  CPC .......... *F16C 33/805* (2013.01); *F16C 41/007* (2013.01); *F16J 15/3232* (2013.01); *F16C 19/186* (2013.01); *F16C 2326/02* (2013.01)

(56) References Cited

U.S. PATENT DOCUMENTS

| | | | |
|---|---|---|---|
| 9,638,324 B2* | 5/2017 | Matsui | F16J 15/3264 |
| 10,302,133 B2* | 5/2019 | Song | F16C 33/78 |
| 2004/0256812 A1 | 12/2004 | Terazawa | |
| 2009/0127795 A1* | 5/2009 | Lattime | F16C 33/7813 |
| | | | 277/412 |
| 2011/0075958 A1 | 3/2011 | Yamaguchi et al. | |
| 2012/0207417 A1* | 8/2012 | Walter | F16C 33/7883 |
| | | | 384/477 |
| 2014/0159318 A1 | 6/2014 | Lattime et al. | |
| 2015/0151574 A1 | 6/2015 | Barberis et al. | |
| 2015/0159761 A1 | 6/2015 | Lattime et al. | |
| 2016/0003302 A1* | 1/2016 | Seno | F16J 15/3264 |
| | | | 277/351 |

FOREIGN PATENT DOCUMENTS

| | | |
|---|---|---|
| EP | 2 878 842 A1 | 6/2015 |
| JP | 63-011929 U1 | 1/1988 |
| JP | 09-144767 A | 6/1997 |
| JP | 2003-021152 A | 1/2003 |
| JP | 2004-308730 A | 11/2004 |
| JP | 2006-097709 A | 4/2006 |
| JP | 2010-025251 A | 2/2010 |
| JP | 2010-091036 A | 4/2010 |
| JP | 2015-094706 A | 5/2015 |
| JP | 2015-110958 A | 6/2015 |

OTHER PUBLICATIONS

International Search Report for corresponding International Application No. PCT/JP2016/075165 dated Nov. 8, 2016.
Written Opinion for corresponding International Application No. PCT/JP2016/075165 dated Nov. 8, 2016.
English translation of Written Opinion for corresponding International Application No. PCT/JP2016/075165 dated Nov. 8, 2016.
English translation of International Preliminary Report on Patentability for corresponding International Application No. PCT/JP2016/075165 dated Mar. 6, 2018.
Chinese Office Action dated Sep. 24, 2019 for corresponding Chinese Application No. 201680046923.8 and English translation.
Notice of Final Rejection dated Sep. 10, 2019 for corresponding Korean Application No. 10-2018-7005600.
Chinese Office Action dated Mar. 21, 2019 for corresponding Chinese Application No. 201680046923.8.
Korean Office Action dated Jun. 17, 2019 for corresponding Korean Application No. 10-2018-7005600.

* cited by examiner

SEALING APPARATUS

CROSS REFERENCE TO RELATED APPLICATIONS

The present application is a continuation application of International Application No. PCT/JP2016/075165, filed on Aug. 29, 2016, which claims priority to Japanese Patent Application No. 2015-172041, filed Sep. 1, 2015. The contents of these applications are incorporated herein by reference in their entirety.

BACKGROUND

Technical Field

The present disclosure relates to a sealing apparatus, and particularly relates to a sealing apparatus at a bearing of, for example, a vehicle.

Background

In a vehicle, for example, in an automobile, a hub bearing rotatably supporting a wheel is in an environment in which the hub bearing is directly exposed to foreign objects such as rainwater, muddy water, and dust. Thus, conventionally, a sealing apparatus is attached to a bearing to seal the bearing from the outside. This sealing apparatus achieves sealing of lubricant inside a hub bearing and also prevents the entrance of foreign objects into the bearing (see Japanese Patent Application Laid-Open No. 2015-94706).

The sealing apparatus used for a hub bearing is required not to increase torque resistance that the sealing apparatus applies to the hub bearing, while preventing the entrance of foreign objects into the hub bearing.

FIG. 3 is a partial cross-sectional view for illustrating a schematic configuration of a conventional sealing apparatus (hereinafter also referred to as a hub seal) attached to a hub bearing. As illustrated in FIG. 3, a sealing apparatus 100 as the conventional hub seal is fit by pressing between an outer ring 201 and an inner ring 202 in a hub bearing 200 to seal a space 203 having a ring shape between the outer ring 201 and the inner ring 202 that each relatively rotate about an identical axis. The sealing apparatus 100 suppresses leakage of lubricant of a rolling element 204, which fills the space 203, and also suppresses the entrance of foreign objects into the space 203.

The sealing apparatus 100 includes a sealing apparatus body 110 and a slinger 118, and as illustrated in FIG. 3, includes a reinforcement ring 111 made of metal and, internally fitted on an inner peripheral surface of the outer ring 201 of the hub bearing 200, an elastic body portion 112 made of rubber material and integrally formed to cover the reinforcement ring 111, and the slinger 118 having a ring shape and externally fitted on an outer peripheral surface of the inner ring 202 of the hub bearing 200. The slinger 118 includes a cylinder portion 118a having a cylindrical shape, and a flange portion 118b formed to have a section orthogonal to the cylinder portion 118a.

In the sealing apparatus body 110, the elastic body portion 112 includes a side lip 115 and a radial lip 116, the side lip 115 slidably contacts the flange portion 118b of the slinger 118, and the radial lip 116 slidably contacts the cylinder portion 118a of the slinger 118. The side lip 115 suppresses ingress of foreign objects into the space 203 of the hub bearing 200.

In the conventional sealing apparatus 100 as illustrated in FIG. 3, prevention of entrance of foreign objects is achieved by the side lip 115. However, prevention of entrance of foreign objects under a more severe use environment has been required due to diversification of use environment of a vehicle, and thus, an improvement in entrance prevention performance for foreign objects has been required for the conventional sealing apparatus 100. Increase of the side lip 115 that slidably contacts the slinger 118, as conventionally done, can be thought of as the improvement of entrance prevention performance for foreign objects, but prevention of entrance of foreign objects by the slidable contact the side lip 115 increases the torque resistance of the hub bearing 200.

SUMMARY

The present disclosure is related to providing a sealing apparatus that can improve an entering prevention function for foreign objects while avoiding increase of torque resistance that occurs.

In accordance with the present disclosure, a sealing apparatus that seals a space between an outer peripheral side member having a ring shape and an inner peripheral side member having a ring shape and at least partially enclosed by the outer peripheral side member, the outer peripheral side member and the inner peripheral side member being each relatively rotatable about an axis line in a bearing, the sealing apparatus comprising a sealing apparatus body attached to the outer peripheral side member, and a slinger having a ring shape, having a center at the axis line, positioned on an outer side of the sealing apparatus body, and attached to the inner peripheral side member, the sealing apparatus body including a reinforcement ring having a ring shape and having a center at the axis line, and an elastic body portion having a ring shape, having a center at the axis line, formed of an elastic body, and attached to the reinforcement ring, the elastic body portion including a seal lip contacting the slinger, and a labyrinth lip forming a gap between the labyrinth lip and the slinger, the slinger including a slinger cylinder portion attached to the inner peripheral side member, a slinger flange portion extending from an end portion of the slinger cylinder portion on the outer side to an outer peripheral side, a slinger bent portion having a ring shape, extending from an end portion of the slinger flange portion on the outer peripheral side to an inner side, bent, and returning, and a slinger extended portion extending from an end portion of the slinger bent portion on the outer peripheral side to the outer peripheral side along the outer peripheral side member, bent, and extending to the inner side along an outer peripheral surface of the outer peripheral side member, and the slinger bent portion and the slinger extended portion form a labyrinth seal, having a gap between the elastic body portion and the outer peripheral side member.

In the sealing apparatus according to an aspect of the present disclosure, wherein the slinger bent portion is formed to have a substantially U-shaped section, and includes a slinger-bent-portion internal cylinder portion extending from the end portion of the slinger flange portion to the inner side, a slinger-bent-portion flange portion extending from an end portion of the slinger-bent-portion internal cylinder portion on the inner side to the outer peripheral side, and a slinger-bent-portion external cylinder portion extending from an end portion of the slinger-bent-portion flange portion on the outer peripheral side to the outer side, the slinger-bent-portion flange portion and slinger-bent-portion external cylinder portion face to the reinforcement ring, and the labyrinth seal extends toward the slinger-bent-portion internal cylinder portion.

In the sealing apparatus according to an aspect of the present disclosure, wherein the labyrinth lip is positioned on an inner peripheral side of the slinger bent portion and forms the gap between the labyrinth lip and the slinger-bent-portion internal cylinder portion at a leading end.

In the sealing apparatus according to an aspect of the present disclosure, wherein the labyrinth lip extends while being tilted to the outer peripheral side and forms a liquid accumulation portion that allows accumulation of a foreign object that arrives through the labyrinth seal.

In the sealing apparatus according to an aspect of the present disclosure, wherein a magnetic encoder included in a rotation speed detection device for a wheel is attached on the outer side of the slinger.

A sealing apparatus according to the present disclosure can improve an entrance prevention function for foreign objects while avoiding increase of torque resistance that occurs.

DETAILED DESCRIPTION

An embodiment of the present disclosure will be described below with reference to drawings.

Figure 1:
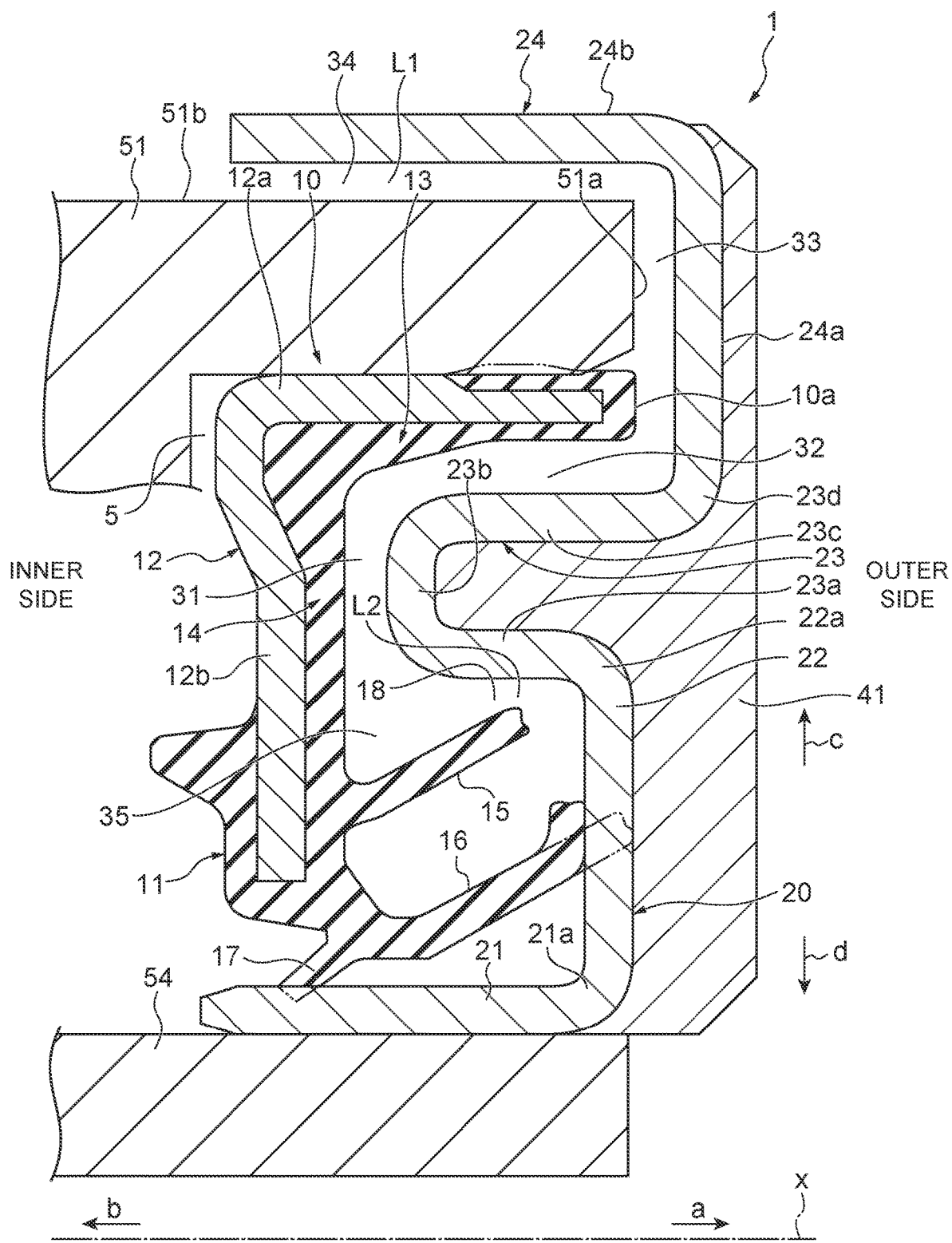
FIG. 1 is a cross-sectional view of a sealing apparatus according to an embodiment of the present disclosure at a section along an axis line.
Figure 2:
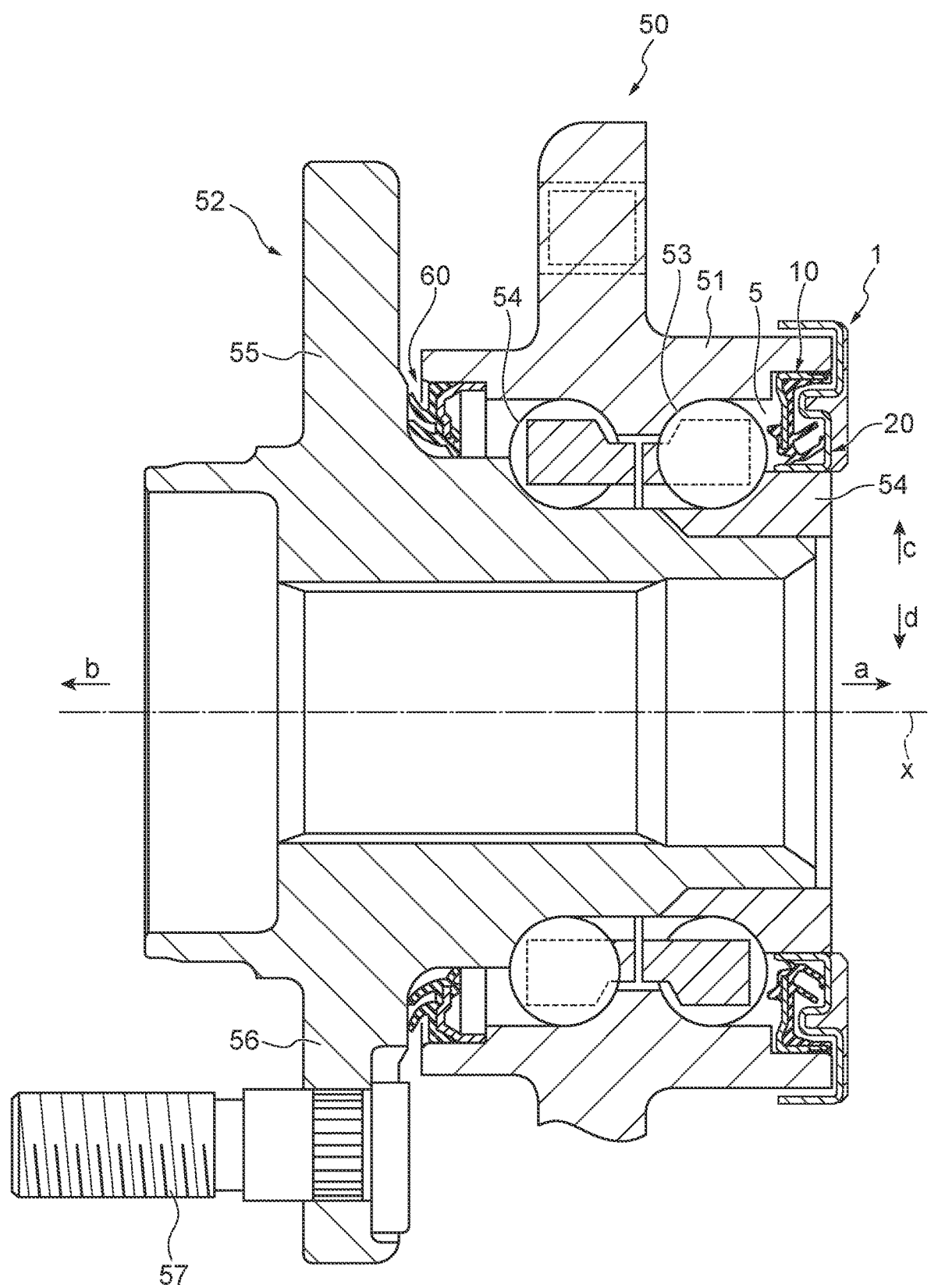
FIG. 2 is a cross-sectional view at a section along an axis line, illustrating a state in which the sealing apparatus according to the embodiment of the present disclosure is attached to a hub bearing.
Figure 3:
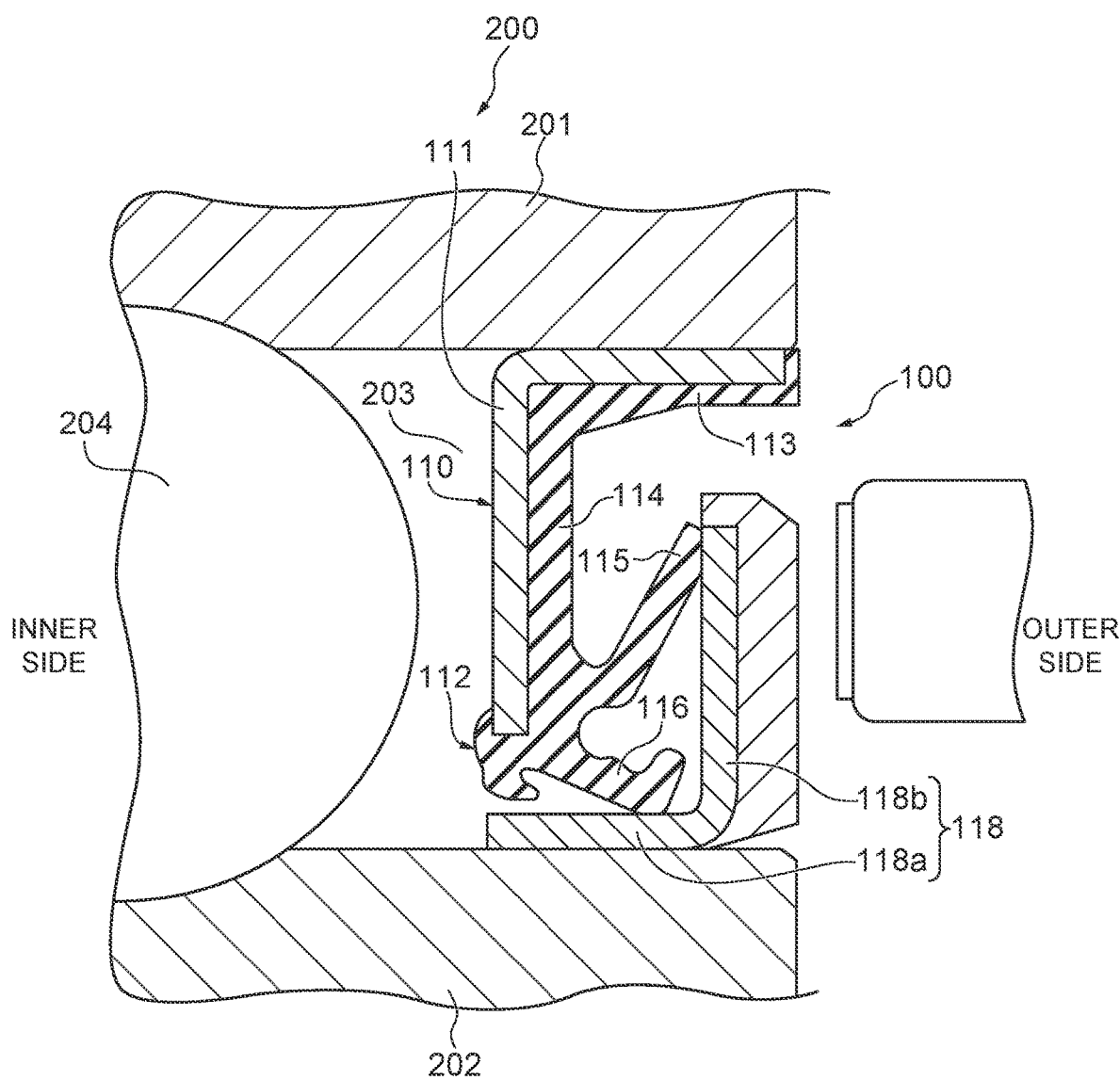
FIG. 3 is a cross-sectional view illustrating a conventional sealing apparatus at a section along an axis line.

FIG. 1 is a cross-sectional view illustrating a schematic configuration of a sealing apparatus 1 according to the embodiment of the present disclosure, and FIG. 2 is a cross-sectional view illustrating a state in which the sealing apparatus 1 according to the embodiment of the present disclosure is attached to a hub bearing 50 rotatably supporting a wheel in, for example, an automobile.

As illustrated in FIG. 2, the hub bearing 50 includes an outer ring 51 as an outer peripheral side member having a ring shape and having a center at an axis line x, a hub 52 as an inner peripheral side member having a ring shape, partially enclosed by the outer ring 51, having a center at the axis line x, and relatively rotatable with respect to the outer ring 51, and a plurality of bearing balls 53 disposed between the outer ring 51 and the hub 52. Specifically, the hub 52 includes an inner ring 54 and a hub ring 55, and a wheel (not illustrated) is attached to a wheel attachment flange 56 of the hub ring 55 through a plurality of hub bolts 57.

The sealing apparatus 1 according to the embodiment of the present disclosure is attached between an inner peripheral surface of the outer ring 51 and an outer peripheral surface of the inner ring 54 in the hub bearing 50. Another sealing apparatus 60 is attached between the inner peripheral surface of the outer ring 51 and an outer peripheral surface of the hub ring 55. The sealing apparatus 1 according to the embodiment of the present disclosure may be attached between the inner peripheral surface of the outer ring 51 and the outer peripheral surface of the hub ring 55 in place of the other sealing apparatus 60.

The sealing apparatus 1 having a ring shape and having a center at the axis line x is disposed in a space 5 between the outer ring 51 and the inner ring 54 in the hub bearing 50 to seal the space 5. The sealing apparatus 1 achieves prevention of leakage of lubricant from the inside of a region in which, for example, the bearing balls 53 are provided in the hub bearing 50, and also achieves prevention of entrance of foreign objects such as rainwater, muddy water, and dust into this region.

As illustrated in FIG. 1, the sealing apparatus 1 according to the embodiment of the present disclosure includes a sealing apparatus body 10 having a ring shape and having a center at the axis line x, and a slinger 20 having a ring shape and having a center at the axis line x. The slinger 20 is disposed on an outer side of the sealing apparatus body 10, facing the sealing apparatus body 10.

The sealing apparatus body 10 includes an elastic body portion 11 made of an elastic body having a ring shape and having a center at the axis line x, and a reinforcement ring 12 made of metal, having a ring shape, and having a center at the axis line x.

The elastic body portion 11 is integrally attached to the reinforcement ring 12. Examples of the elastic body of the elastic body portion 11 include various rubber materials. Examples of the rubber materials include synthetic rubbers such as nitrile rubber (NBR), hydrogenated nitrile rubber (H-NBR), acrylic rubber (ACM), and fluorine rubber (FKM). Examples of the metal material of the reinforcement ring 12 include stainless steel and SPCC (cold rolled steel sheet).

As illustrated in FIG. 1, the elastic body portion 11 includes an outer peripheral portion 13 having a cylindrical shape, having a center at the axis line x, and extending on an outer peripheral side, and a base portion 14 extending from an end portion of the outer peripheral portion 13 on an inner side to an inner peripheral direction.

For the purpose of description, as illustrated in FIG. 1, the outer side is a side in the direction of arrow a situated along the direction of the axis line x, and the inner side is a side in the direction of arrow b in the direction of the axis line x. In other words, the outer side is a side in a direction facing an external side of the hub bearing 50, and is a side in a direction facing an air side on which foreign objects exist. The inner side is a side in a direction facing an internal side of the hub bearing 50, and a side in a direction facing the space 5. The outer peripheral side is a side in a direction (the direction of arrow c in FIG. 1) departing from the axis line x along a direction (hereinafter also referred to as a "radial direction") orthogonal to the axis line x, and an inner peripheral side is a side in a direction (the direction of arrow d in FIG. 1) approaching the axis line x along the direction orthogonal to the axis line x.

The base portion 14 includes a labyrinth lip 15 forming a gap 18 from the slinger 20 without contacting the slinger 20, and a side lip 16 and a radial lip 17 as seal lips contacting the slinger 20. The labyrinth lip 15 and the side lip 16 are each a lip having a ring shape and having a center at the axis line x and extend toward the outer side, and the radial lip 17 is a lip having a ring shape and having a center at the axis line x and extends toward the inner peripheral side. The labyrinth lip 15 is provided on the outer peripheral side (in the direction of arrow c) of the side lip 16, and the radial lip 17 is provided on the inner peripheral side (in the direction of arrow d) and the inner side of the side lip 16. As illustrated in FIG. 1, the labyrinth lip 15 extends while being tilted to the direction of the axis line x, for example, extends in a direction tilting to the outer peripheral side from the direction of the axis line x, and has a circular cone shape having a larger diameter at a position farther on the outer side (in the direction of arrow a) in the direction of the axis line x. The side lip 16 extends being tilted to the direction of the axis line x, for example, extends in a direction tilting to the outer peripheral side from the direction of the axis line x, and has a circular cone shape having a larger diameter at a position farther on the outer side in the direction of the axis line x. As illustrated in FIG. 1, the radial lip 17 extends while being tilted to the radial direction, for example, extends in a direction tilting to the inner side from the radial direction, and has a circular cone or circular ring shape having a larger diameter in the radial direction at a position farther on the inner peripheral side in the radial direction.

The reinforcement ring 12 has a section having a substantially L shape along the axis line x, and includes a cylinder portion 12a having a cylindrical shape and having a center at the axis line x, and a disk portion 12b having a disk shape, having a center at the axis line x, and extending from an end portion of the cylinder portion 12a on the inner side toward the inner peripheral side. The elastic body portion 11 is attached to the reinforcement ring 12 from the inner peripheral side and the outer side, and, thus the elastic body portion 11 is reinforced. Specifically, the outer peripheral portion 13 of the elastic body portion 11 is attached to the cylinder portion 12a of the reinforcement ring 12 from the inner peripheral side, and as illustrated in FIG. 1, an end portion of the cylinder portion 12a on the outer side is covered by the outer peripheral portion 13 and buried. The base portion 14 of the elastic body portion 11 is attached to the disk portion 12b of the reinforcement ring 12 from the inner peripheral side, and, as illustrated in FIG. 1, an end portion of the disk portion 12b on the inner peripheral side is covered by the base portion 14 and buried. The outer peripheral portion 13 of the elastic body portion 11 forms a gasket portion fitted to the outer ring 51 at part of the cylinder portion 12a of the reinforcement ring 12 on the outer peripheral side, and is compressed between the inner peripheral surface of the outer ring 51 and the cylinder portion 12a of the reinforcement ring 12 and generates force toward the outer side in the radial direction when the sealing apparatus body 10 is fit to the outer ring 51 by pressing.

The reinforcement ring 12 is manufactured by, for example, press fabrication or forging, and the elastic body portion 11 is molded with a mold by cross-linking (vulcanization). During this crosslinked molding, the reinforcement ring 12 is placed inside the mold, the elastic body portion 11 is bonded to the reinforcement ring 12 by cross-linking, and the elastic body portion 11 is integrally molded with the reinforcement ring 12.

The slinger 20 is a member made of metal, for example, made of stainless steel, and is a member having a plate and ring shape and having a center at the axis line x. The slinger 20 includes a slinger cylinder portion 21 having a ring shape, having a center at the axis line x, and internally fitted on the outer peripheral surface of the inner ring 54, a slinger flange portion 22 having a ring shape, having a center at the axis line x, and extending from an outer peripheral end portion 21a that is an end portion of the slinger cylinder portion 21 on the outer side to the outer peripheral side, a slinger bent portion 23 extending from an outer peripheral end portion 22a that is an end portion of the slinger flange portion 22 on the outer peripheral side to the inner side (the direction of arrow b), bent, and returning, and a slinger extended portion 24 extending from an outer peripheral end portion 23d that is an end portion of the slinger bent portion 23 on the outer peripheral side to the outer peripheral side along an outer side surface 51a that is an end face of the outer ring 51 facing the outer side, bent, and extending to the inner side along an outer peripheral surface 51b that is a peripheral surface facing an outer peripheral surface of the outer ring 51. The slinger extended portion 24 includes a slinger-extended-portion flange portion 24a having a disk shape and having a center at the axis line x, and a slinger-extended-portion cylinder portion 24b having a cylindrical shape and having a center at the axis line x.

More specifically, the slinger bent portion 23 is formed to have a substantially U-shaped section, and includes a slinger-bent-portion internal cylinder portion 23a extending from the outer peripheral end portion 22a of the slinger flange portion 22 to the inner side, a slinger-bent-portion flange portion 23b extending from an end portion of the slinger-bent-portion internal cylinder portion 23a on the inner side to the outer peripheral side, and a slinger-bent-portion external cylinder portion 23c extending from an end portion of the slinger-bent-portion flange portion 23b on the outer peripheral side to the outside. The slinger-bent-portion flange portion 23b and the slinger-bent-portion external cylinder portion 23c face the reinforcement ring 12, and the labyrinth lip 15 extends toward the slinger-bent-portion internal cylinder portion 23a.

As illustrated in FIG. 1, the slinger 20 is disposed facing the base portion 14 of the elastic body portion 11 of the sealing apparatus body 10. Specifically, the side lip 16 contacts a surface of the slinger flange portion 22 on the inner side with a predetermined interference (contact width) at a leading end portion, and forms a seal portion accordingly. The radial lip 17 contacts a surface of the slinger cylinder portion 21 on the outer peripheral side with a predetermined interference at a leading end portion, and forms a seal portion accordingly.

As illustrated in FIG. 1, the slinger 20 is disposed facing to the base portion 14 of the elastic body portion 11 of the sealing apparatus body 10, forming a small gap there between. Specifically, the labyrinth lip 15 forms the gap 18 having a ring shape between the labyrinth lip 15 and a surface of the slinger-bent-portion internal cylinder portion 23a of the slinger bent portion 23 on the inner peripheral side. As illustrated in FIG. 1, the slinger bent portion 23 of the slinger 20 faces the base portion 14 of the elastic body portion 11 at the slinger-bent-portion flange portion 23b, and forms a gap 31 having a ring shape. The slinger bent portion 23 faces the outer peripheral portion 13 of the elastic body portion 11 at the slinger-bent-portion external cylinder portion 23c, and forms a gap 32 having a ring shape. The slinger extended portion 24 of the slinger 20 faces, at the slinger-extended-portion flange portion 24a, an outer peripheral outer side end portion 10a that is an end portion of the sealing apparatus body 10 on the outer peripheral side and the outer side and the outer side surface 51a of the outer ring 51, and forms a gap 33 having a ring shape. The slinger extended portion 24 of the slinger 20 faces an outer peripheral surface 51b of the outer ring 51 at the slinger-extended-portion cylinder portion 24b, and forms a gap 34 having a ring shape. In the present embodiment, the outer peripheral outer side end portion 10a is defined by an end portion of the outer peripheral portion 13 of the elastic body portion 11 on the outer side. The outer peripheral outer side end portion 10a is not limited to that defined by the outer peripheral portion 13 of the elastic body portion 11, but may be defined by the end portion of the cylinder portion 12a of the reinforcement ring 12 on the outer side.

The gaps 31 to 34 are continuously defined by the slinger 20 on the outer side thereof, forming a continuous small gap.

When it is assumed that foreign objects such as rainwater, muddy water, and dust arrive at the side lip 16 and the radial lip 17 from the outside, the foreign objects sequentially pass through the gaps 34 to 31 and receive high flow resistance before arriving at the side lip 16 and the radial lip 17. Accordingly, the gaps 31 to 34 form a labyrinth seal L1.

In this manner, in the sealing apparatus 1, the sealing apparatus body 10 and the slinger 20 form the labyrinth seal L1 across the gap 34, the gap 33, the gap 32, and the gap 31 on an upstream side on a path from which foreign objects enter from the outside to the inside, and the labyrinth seal L1 achieves prevention of entrance of foreign objects on the upstream side on the entrance path of foreign objects.

The labyrinth lip 15 is positioned on the inner peripheral side of the slinger bent portion 23 and extends in the direction tilting to the outer peripheral side from the direction of the axis line x, and a leading end portion thereof forms the gap 18 between the leading end portion and the slinger-bent-portion internal cylinder portion 23a, forming a labyrinth seal L2.

In this manner, in the sealing apparatus 1, the labyrinth lip 15 forms the gap 18 and forms the labyrinth seal L2 downstream of the labyrinth seal L1 on the entrance path of foreign objects, and the labyrinth seal L2 additionally achieves prevention of entrance of foreign objects on the entrance path of foreign objects.

The labyrinth lip 15 and the base portion 14 of the elastic body portion 11 form a liquid accumulation portion 35 having a ring and groove shape, recessed on the inner peripheral side, and opening the outer peripheral side in a part sandwiched between the labyrinth lip 15 and the base portion 14. As described above, since the labyrinth lip 15 forms the gap 18 between the labyrinth lip 15 and the slinger-bent-portion internal cylinder portion 23a and forms the labyrinth seal L2, any foreign object having arrived through the labyrinth seal L1 is unlikely to pass through the labyrinth seal L2 and is captured and accumulated in the liquid accumulation portion 35. Thus, further entrance of the foreign object into the seal inside can be suppressed. Any foreign object accumulated in the liquid accumulation portion 35 falls due to its own weight, and the foreign object, having fallen downward receives the effect of centrifugal force due to rotation of the inner ring 54 (slinger 20) and is returned to the outer peripheral side and discharged to the outside of the sealing apparatus 1. Accordingly, the number of foreign objects arriving at the side lip 16 and the radial lip 17 can be further reduced. When the sealing apparatus body 10 rotates, any foreign object accumulated in the liquid accumulation portion 35 receives the effect of centrifugal force of the rotation and is discharged to the outside of the sealing apparatus 1, and thus, further entrance of the foreign object into the seal inside can be suppressed.

A magnetic encoder 41 included in a rotation speed detection device for a wheel may be attached on the outer side of the slinger 20. Since the slinger 20 is formed to extend from the slinger cylinder portion 21 to the slinger extended portion 24 and to have a wide width in the radial direction, a bonding area of the magnetic encoder 41 to the slinger 20 can be large and the magnetic encoder 41 having a large detection region can be attached to the slinger 20.

In this manner, in the sealing apparatus 1 according to the embodiment of the present disclosure, the labyrinth seals L1 and L2 are formed from the upstream side on the entrance path of foreign objects such as rainwater, muddy water, and dust from the outside in addition to the side lip 16 and the radial lip 17, and an entrance prevention function for foreign objects can be improved.

Any foreign object having flowed through the labyrinth seal L1 attempts to pass through the labyrinth seal L2, but this foreign object is captured and accumulated in the liquid accumulation portion 35 before passing through the labyrinth seal L2, falls downward due to its own weight, receives the effect of centrifugal force based on rotation of the hub bearing 50, and is discharged to the outside. Accordingly, the entrance prevention function for foreign objects can be further improved.

In the sealing apparatus 1, improvement of the entrance prevention function for foreign objects is achieved by the labyrinth seals L1 and L2 and the liquid accumulation portion 35 that the sealing apparatus body 10 and the outer ring 51, which do not rotate, and the slinger 20, which rotates, form without contacting each other. Thus, because of the improvement of the entrance prevention function for foreign objects, torque resistance that occurs at the slinger 20 does not increase, and the entrance prevention function for foreign objects can be improved in the sealing apparatus 1 while increase of the torque resistance that occurs at the slinger 20 is avoided.

As described above, in the sealing apparatus 1 according to the embodiment of the present disclosure, since the gap 34 defined by the outer peripheral surface 51b of the outer ring 51 and the slinger-extended-portion cylinder portion 24b, the gap 33 defined by the outer peripheral outer side end portion 10a of the sealing apparatus body 10 on the outer peripheral side (in the direction of arrow c) and the outer side (the direction of arrow a), the outer side surface 51a of the outer ring 51, and the slinger-extended-portion flange portion 24a, the gap 32 defined by the slinger-bent-portion external cylinder portion 23c and the outer peripheral portion 13 of the elastic body portion 11, and the gap 31 defined by the slinger-bent-portion flange portion 23b and the base portion 14 of the elastic body portion 11 form the labyrinth seal L1, foreign objects such as rainwater, muddy water, and dust entering from the outside receive considerable flow resistance due to the labyrinth seal L1 and are suppressed from entering into the sealing apparatus 1.

Since the labyrinth lip 15 forms the labyrinth seal L2 by the gap 18 between the labyrinth lip 15 and the slinger-bent-portion internal cylinder portion 23a, any foreign object having passed through the labyrinth seal L1 can be further suppressed from passing through the labyrinth seal L2.

Since the liquid accumulation portion 35 is formed close to the labyrinth seal L2 downstream of the gap 31 on the entrance path of foreign objects, any foreign object having passed through the labyrinth seal L1 is captured and accumulated in the liquid accumulation portion 35 and returned to the outside due to its own weight and the effect of centrifugal force, thereby suppressing ingress of the foreign object into the sealing apparatus 1.

Since the labyrinth lip 15 does not contact the slinger 20, forming the gap 18 between the labyrinth lip 15 and the slinger 20, the torque resistance that occurs at the hub bearing 50 can be reduced.

Since the slinger 20 is formed to have a large width in the radial direction, the bonding area of the magnetic encoder 41 to the slinger 20 can be large, and the magnetic encoder 41 having a large detection region can be attached to the slinger 20.

Although the preferable embodiment of the present disclosure is described above, the present disclosure is not limited to the sealing apparatus 1 according to the above-described embodiment, but includes any aspect included in the concept of the present disclosure and the claims. Configurations may be selectively combined as appropriate to achieve at least part of the problem and effect described above. For example, the shape, material, disposition, and size of each component in the above-described embodiment may be changed as appropriate in accordance with a specific usage of the present disclosure.

What is claimed is:

1. A sealing apparatus that seals a space between an outer peripheral side member having a ring shape and an inner peripheral side member having a ring shape and at least partially enclosed by the outer peripheral side member, the outer peripheral side member and the inner peripheral side member being each relatively rotatable about an axis line in a bearing, the sealing apparatus comprising:
    a sealing apparatus body attached to the outer peripheral side member; and
    a slinger having a ring shape, having a center at the axis line, positioned on an outer side of the sealing apparatus body, and attached to the inner peripheral side member,
    the sealing apparatus body including a reinforcement ring having a ring shape and having a center at the axis line, and an elastic body portion having a ring shape, having a center at the axis line, formed of an elastic body, and attached to the reinforcement ring,
    the elastic body portion including a seal lip contacting the slinger, and a labyrinth lip forming a first gap between the labyrinth lip and the slinger,
    the slinger including a slinger cylinder portion attached to the inner peripheral side member, a slinger flange portion extending from an end portion of the slinger cylinder portion on the outer side to an outer peripheral side, a slinger bent portion having a ring shape, extending from an end portion of the slinger flange portion on the outer peripheral side to an inner side, bent, and returning, and a slinger extended portion extending from an end portion of the slinger bent portion on the outer peripheral side to the outer peripheral side along the outer peripheral side member, bent, and extending to the inner side along an outer peripheral surface of the outer peripheral side member,
    the slinger bent portion and the slinger extended portion form a labyrinth seal disposed between the elastic body portion and the outer peripheral side member,
    the slinger bent portion is formed to have a substantially U-shaped section, and includes a slinger-bent-portion internal cylinder portion extending from the end portion of the slinger flange portion to the inner side, a slinger-bent-portion flange portion extending from an end portion of the slinger-bent-portion internal cylinder portion on the inner side to the outer peripheral side, and a slinger-bent-portion external cylinder portion extending from an end portion of the slinger-bent-portion flange portion on the outer peripheral side to the outer side,
    the labyrinth lip extends toward the slinger-bent-portion internal cylinder portion, and forms the first gap having a ring shape,
    the slinger-bent-portion flange portion faces a base portion of the elastic body portion, and forms a second gap having a ring shape,
    the slinger-bent-portion external cylinder portion faces an outer peripheral portion of the elastic body portion, and forms a third gap having a ring shape, and
    the labyrinth seal is defined by the first gap, the second gap, and the third gap.

2. The sealing apparatus according to claim 1, wherein
    the slinger extended portion includes a slinger-extended-portion flange portion having a disk shape and having a center at the axis line, and a slinger-extended-portion cylinder portion having a cylindrical shape and having a center at the axis line,
    the slinger-extended-portion flange portion faces an outer peripheral outer side end portion of the sealing apparatus body and the outer side surface of the outer ring, and forms a fourth gap having a ring shape, and
    the slinger-extended-portion cylinder portion faces an outer peripheral surface of the outer ring, and forms a fifth gap having a ring shape.

3. The sealing apparatus according to claim 2, wherein the labyrinth lip is positioned on an inner peripheral side of the slinger bent portion and forms the first gap between the labyrinth lip and the slinger-bent-portion internal cylinder portion at a leading end.

4. The sealing apparatus according to claim 1, wherein the labyrinth lip extends while being tilted to the outer peripheral side and forms a liquid accumulation portion that allows accumulation of a foreign object that arrives through the labyrinth seal.

5. The sealing apparatus according to claim 1, wherein a magnetic encoder included in a rotation speed detection device for a wheel is attached on the outer side of the slinger.

* * * * *